C. R. LORD.
HAND BRAKE FOR RAILROAD CARS.
APPLICATION FILED SEPT. 23, 1916.
1,223,891.
Patented Apr. 24, 1917.
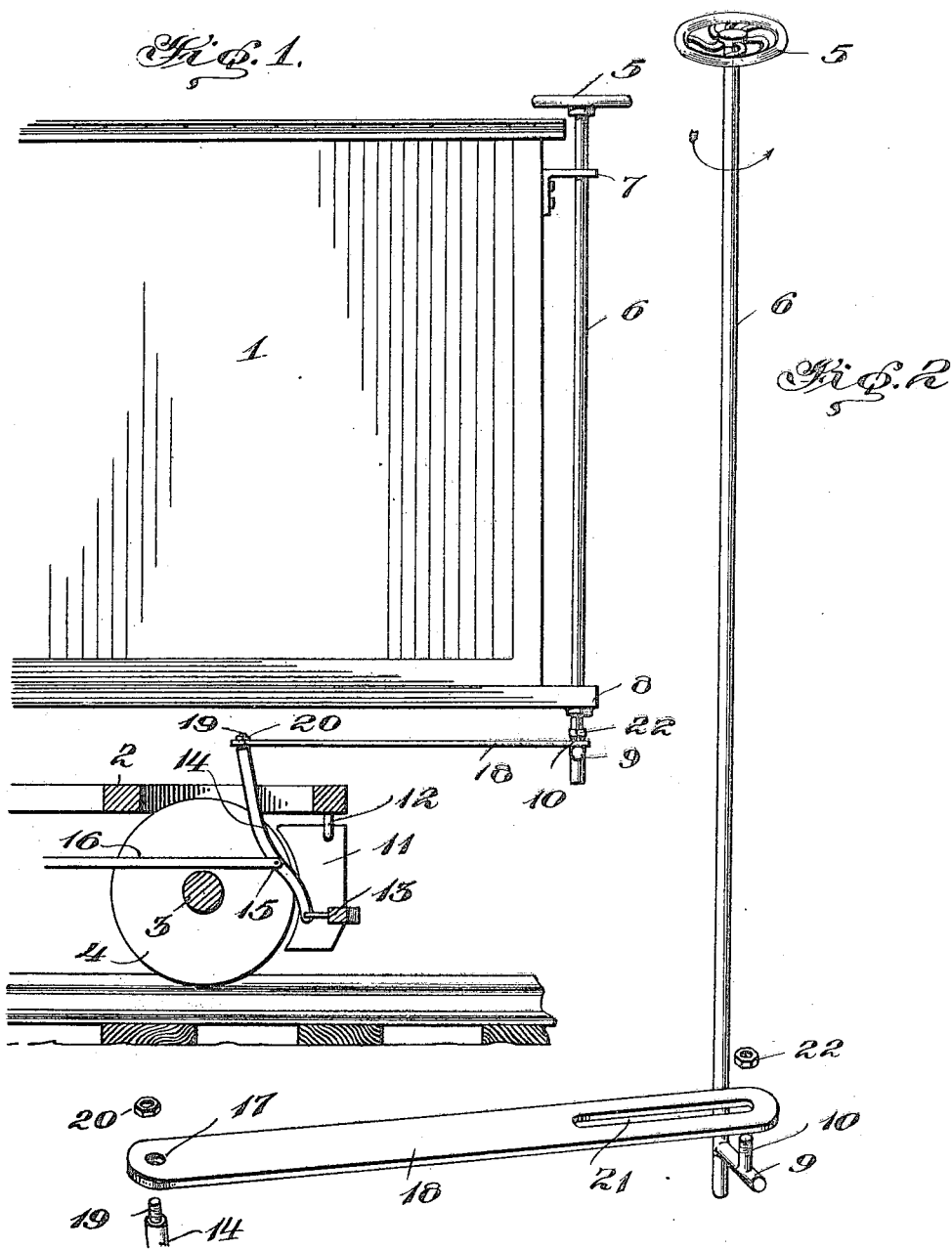
Witness
Ernest C. Croker
Inventor
Chester R. Lord
By J. W. Bowes
Attorney

UNITED STATES PATENT OFFICE.

CHESTER R. LORD, OF MINERAL CITY, OHIO.

HAND-BRAKE FOR RAILROAD-CARS.

1,223,891. Specification of Letters Patent. Patented Apr. 24, 1917.

Application filed September 23, 1916. Serial No. 121,740.

*To all whom it may concern:*

Be it known that I, CHESTER R. LORD, a citizen of the United States, residing at Mineral City, in the county of Tuscarawas and State of Ohio, have invented a new and useful Hand-Brake for Railroad-Cars, of which the following is a specification.

My invention relates to hand brakes for railroad cars and has more especial reference to a quick acting brake in which the usual chain is eliminated.

The objects of my invention are to generally improve hand brakes for railroad cars, to provide a quick acting brake and to eliminate the usual chain, and to provide against accidents, resulting from runaway cars.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

In the accompanying drawing:

Figure 1 is a side elevation of a portion of a railroad car, showing my improved hand brake applied thereto, parts being broken away for the purpose of illustration.

Fig. 2 is a detached perspective view of the brake wheel shaft and brake rod.

Similar numerals of reference indicate corresponding parts throughout the several figures of the drawings.

Referring more especially to the construction illustrated in the accompanying drawings, the numeral 1 indicates a portion of a body of a freight car which is carried upon trucks of any usual construction, a portion of one of said trucks being indicated by the numeral 2, the numeral 3 indicating an axle carried by said truck and the numeral 4 one of the wheels mounted upon said axle.

The brake wheel 5 is mounted upon the shaft 6 which is journaled in suitable bearings 7 and 8 at the end of the car body. A radial arm 9 is provided upon said wheel shaft near the lower extremity thereof and an upwardly disposed finger 10 is mounted on said arm, said finger being preferably screw threaded at its upper extremity.

Each brake shoe 11 is pivotally connected at 12 to a convenient portion of the truck, a brake beam 13 connecting each adjacent pair of brake shoes. A lever 14 is pivotally connected at its lower extremity to the brake beam 13 and pivotally connected intermediate its extremities as at 15 to the connecting link 16. The upper extremity of the lever 14 is passed through an aperture 17 located at one extremity of the brake rod 18, said aperture being sufficiently large to permit free movement of the extremity of the lever therein, said upper extremity being preferably reduced as shown at 19 and provided with screw threads adapted to receive the retaining nut 20. The brake rod 18 is provided at its other extremity with an elongated slot 21, within which the finger 10 is located a retaining nut 22 being provided upon the upper extremity of said finger.

The brake wheel is arranged to be rotated in the direction of the arrow shown in Fig. 2 moving the brake rod and through the lever 14 drawing the shoes 11 into contact with the periphery of the wheels. The slot 21 is provided in order that the air may be used independently of the hand brake, the hand brake mechanism above described not interfering with the air.

By providing the brake rod and doing away with the usual chain which ordinarily connects the brake shoes with the wheel shaft, the brakeman can more easily and readily control the car, thereby preventing a car from running away as the use of the brake rod makes a quick acting brake, there being no long chain to wind up in order to throw on the brakes.

I claim:—

In combination with a car truck, a car brake comprising brake shoes pivotally mounted upon said truck, a brake beam fixedly attached to said brake shoes, a lever pivotally connected to said brake beam, a connecting link pivotally connected to said lever intermediate the extremities thereof, a brake bar pivotally connected to the upper extremity of said lever, said brake bar having a slot near its other extremity, a brake wheel shaft, a radial arm provided upon said shaft, and a pin carried on said arm and located through the slot in said brake bar.

In testimony that I claim the above, I have hereunto subscribed my name.

CHESTER R. LORD.

Copies of this patent may be obtained for five cents each, by addressing the "Commissioner of Patents, Washington, D. C."